United States Patent
Harris et al.

(10) Patent No.: US 9,619,489 B2
(45) Date of Patent: *Apr. 11, 2017

(54) VIEW OF A PHYSICAL SPACE AUGMENTED WITH SOCIAL MEDIA CONTENT ORIGINATING FROM A GEO-LOCATION OF THE PHYSICAL SPACE

(71) Applicant: Geofeedia, Inc., Chicago, IL (US)

(72) Inventors: Philip B. Harris, Naples, FL (US); Scott K. Mitchell, Naples, FL (US); Michael J. Mulroy, Golf, IL (US)

(73) Assignee: Geofeedia, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,289

(22) Filed: Apr. 15, 2016

(65) Prior Publication Data
US 2016/0232182 A1   Aug. 11, 2016

Related U.S. Application Data

(63) Continuation of application No. 14/215,612, filed on Mar. 17, 2014, now Pat. No. 9,317,600.
(Continued)

(51) Int. Cl.
*G06F 7/00* (2006.01)
*G06F 17/30* (2006.01)
(Continued)

(52) U.S. Cl.
CPC ...... *G06F 17/30268* (2013.01); *G06F 17/241* (2013.01); *G06F 17/3087* (2013.01);
(Continued)

(58) Field of Classification Search
CPC ........... G06F 17/3087; G06F 17/30241; G06F 17/30265; G06T 5/50; G06T 1/0028; G06T 1/0021; G06T 1/0007; G06T 2207/30
See application file for complete search history.

(56) References Cited

U.S. PATENT DOCUMENTS 6,026,368 A   2/2000 Brown
6,363,320 B1  3/2002 Chou
(Continued)

FOREIGN PATENT DOCUMENTS

EP    1045345 A1   10/2000
EP    2187594 A1   5/2010
(Continued)

OTHER PUBLICATIONS

Amitay et al., "Web-a-Where: Geotaqqinq Web Content", Proceedings of the 27th Annual International ACM SIGIR Conference on Research and Development in Information Retrieval (SIGIR), 2004, pp. 273-280.
(Continued)

*Primary Examiner* — Marc Somers
(74) *Attorney, Agent, or Firm* — Sheppard Mullin Richter & Hampton LLP

(57) ABSTRACT

The disclosure relates to systems and methods for augmenting a view of a physical space of one or more geographically definable locations ("geo-locations") with social media and/or other content originating from the one or more geo-locations. Generally speaking, the system may include a computing device having one or more processors programmed to augment (e.g., add to, overlay, embed, etc.) the view of the physical space of a geo-location with social media content, thereby allowing a user to view a physical space at a geo-location along with social media content that was created from the geo-location.

20 Claims, 4 Drawing Sheets

Related U.S. Application Data

(60) Provisional application No. 61/800,951, filed on Mar. 15, 2013.

(51) Int. Cl.
*G06F 17/24* (2006.01)
*G06T 19/00* (2011.01)
*H04L 12/58* (2006.01)

(52) U.S. Cl.
CPC .. *G06F 17/30241* (2013.01); *G06F 17/30259* (2013.01); *G06F 17/30554* (2013.01); *G06F 17/30861* (2013.01); *G06T 19/006* (2013.01); *H04L 51/046* (2013.01); *H04L 51/32* (2013.01)

(56) References Cited

U.S. PATENT DOCUMENTS

| | | |
|---|---|---|
| 6,591,266 B1 | 7/2003 | Li |
| 7,522,940 B2 | 4/2009 | Jendbro |
| 7,680,796 B2 | 3/2010 | Yeh |
| 7,698,336 B2 | 4/2010 | Nath |
| 7,912,451 B2 | 3/2011 | Eckhart |
| 7,974,983 B2 | 7/2011 | Goeldi |
| 8,103,741 B2 | 1/2012 | Frazier |
| 8,341,223 B1 | 12/2012 | Patton |
| 8,428,228 B1 | 4/2013 | Baxter, Jr. |
| 8,484,224 B1 | 7/2013 | Harris |
| 8,595,317 B1 | 11/2013 | Harris |
| 8,612,533 B1 | 12/2013 | Harris |
| 8,639,767 B1 | 1/2014 | Harris |
| 8,655,873 B2 | 2/2014 | Mitchell |
| 8,655,983 B1 | 2/2014 | Harris |
| 8,812,951 B1 | 8/2014 | White |
| 8,843,515 B2 | 9/2014 | Burris |
| 8,849,935 B1 | 9/2014 | Harris |
| 8,850,531 B1 | 9/2014 | Harris |
| 8,862,589 B2 | 10/2014 | Harris |
| 8,990,346 B2 | 3/2015 | Harris |
| 9,055,074 B2 | 6/2015 | Harris |
| 9,077,675 B2 | 7/2015 | Harris |
| 9,077,782 B2 | 7/2015 | Harris |
| 9,258,373 B2 | 2/2016 | Harris |
| 9,307,353 B2 | 4/2016 | Harris |
| 9,317,600 B2 | 4/2016 | Harris |
| 9,369,533 B2 | 6/2016 | Harris |
| 9,436,690 B2 | 9/2016 | Harris |
| 9,443,090 B2 | 9/2016 | Harris |
| 9,479,557 B2 | 10/2016 | Harris |
| 9,485,318 B1 | 11/2016 | Harris |
| 9,497,275 B2 | 11/2016 | Harris |
| 2002/0029226 A1 | 3/2002 | Li |
| 2002/0029384 A1 | 3/2002 | Griggs |
| 2002/0116505 A1 | 8/2002 | Higgins |
| 2002/0128908 A1 | 9/2002 | Levin |
| 2002/0188669 A1 | 12/2002 | Levine |
| 2003/0018607 A1 | 1/2003 | Lennon |
| 2003/0025832 A1 | 2/2003 | Swart |
| 2003/0040971 A1 | 2/2003 | Freedenberg |
| 2003/0088609 A1 | 5/2003 | Guedalia |
| 2004/0203854 A1 | 10/2004 | Nowak |
| 2004/0205585 A1 | 10/2004 | McConnell |
| 2004/0225635 A1 | 11/2004 | Toyama |
| 2005/0034074 A1 | 2/2005 | Munson |
| 2006/0002317 A1 | 1/2006 | Venkata |
| 2006/0106778 A1 | 5/2006 | Baldwin |
| 2006/0184968 A1 | 8/2006 | Clayton |
| 2006/0200305 A1 | 9/2006 | Sheha |
| 2007/0043721 A1 | 2/2007 | Ghemawat |
| 2007/0112729 A1 | 5/2007 | Wiseman |
| 2007/0121843 A1 | 5/2007 | Atazky |
| 2007/0143345 A1 | 6/2007 | Jones |
| 2007/0210937 A1 | 9/2007 | Smith |
| 2007/0276919 A1 | 11/2007 | Buchmann |
| 2007/0294299 A1 | 12/2007 | Goldstein |
| 2008/0092054 A1 | 4/2008 | Bhumkar |
| 2008/0104019 A1 | 5/2008 | Nath |
| 2008/0125969 A1 | 5/2008 | Chen |
| 2008/0147674 A1 | 6/2008 | Nandiwada |
| 2008/0162540 A1 | 7/2008 | Parikh |
| 2008/0189099 A1 | 8/2008 | Friedman |
| 2008/0192934 A1 | 8/2008 | Nelger |
| 2008/0250031 A1 | 10/2008 | Ting |
| 2008/0294603 A1 | 11/2008 | Ranjan |
| 2009/0005968 A1 | 1/2009 | Vengroff |
| 2009/0102859 A1 | 4/2009 | Athsani |
| 2009/0132435 A1 | 5/2009 | Titus |
| 2009/0138497 A1 | 5/2009 | Zavoli |
| 2009/0210426 A1 | 8/2009 | Kulakov |
| 2009/0217232 A1 | 8/2009 | Beerel |
| 2009/0222482 A1 | 9/2009 | Klassen |
| 2009/0297118 A1 | 12/2009 | Fink |
| 2009/0300528 A1 | 12/2009 | Stambaugh |
| 2009/0327232 A1 | 12/2009 | Carter |
| 2010/0010907 A1 | 1/2010 | Dasgupta |
| 2010/0030648 A1 | 2/2010 | Manolescu |
| 2010/0076968 A1 | 3/2010 | Boyns |
| 2010/0079338 A1 | 4/2010 | Wooden |
| 2010/0083124 A1 | 4/2010 | Druzgalski |
| 2010/0145947 A1 | 6/2010 | Kolman |
| 2010/0149399 A1 | 6/2010 | Mukai |
| 2010/0153386 A1 | 6/2010 | Tysowski |
| 2010/0153410 A1 | 6/2010 | Jin |
| 2010/0174998 A1 | 7/2010 | Lazarus |
| 2010/0177120 A1 | 7/2010 | Balfour |
| 2010/0180001 A1 | 7/2010 | Hardt |
| 2011/0007941 A1 | 1/2011 | Chen |
| 2011/0010674 A1 | 1/2011 | Knize |
| 2011/0035284 A1 | 2/2011 | Moshfeghi |
| 2011/0040894 A1 | 2/2011 | Shrum |
| 2011/0055176 A1 | 3/2011 | Choi |
| 2011/0072106 A1 | 3/2011 | Hoffert |
| 2011/0072114 A1 | 3/2011 | Hoffert |
| 2011/0078584 A1 | 3/2011 | Winterstein |
| 2011/0083013 A1 | 4/2011 | Nice |
| 2011/0113096 A1 | 5/2011 | Long |
| 2011/0123066 A9 | 5/2011 | Chen |
| 2011/0131496 A1 | 6/2011 | Abram |
| 2011/0137561 A1 | 6/2011 | Kankainen |
| 2011/0142347 A1 | 6/2011 | Chen |
| 2011/0153368 A1 | 6/2011 | Pierre |
| 2011/0202544 A1 | 8/2011 | Carle |
| 2011/0227699 A1 | 9/2011 | Seth |
| 2011/0270940 A1 | 11/2011 | Johnson |
| 2011/0288917 A1 | 11/2011 | Wanek |
| 2011/0307307 A1 | 12/2011 | Benmbarek |
| 2012/0001938 A1 | 1/2012 | Sandberg |
| 2012/0047219 A1 | 2/2012 | Feng |
| 2012/0077521 A1 | 3/2012 | Boldyrev |
| 2012/0078503 A1 | 3/2012 | Dzubay |
| 2012/0084323 A1 | 4/2012 | Epshtein |
| 2012/0101880 A1 | 4/2012 | Alexander |
| 2012/0124161 A1 | 5/2012 | Tidwell |
| 2012/0150901 A1 | 6/2012 | Johnson |
| 2012/0158536 A1 | 6/2012 | Gratton |
| 2012/0166367 A1 | 6/2012 | Murdock |
| 2012/0212398 A1 | 8/2012 | Border |
| 2012/0221687 A1 | 8/2012 | Hunter |
| 2012/0232939 A1 | 9/2012 | Pierre |
| 2012/0233158 A1 | 9/2012 | Braginsky |
| 2012/0239763 A1 | 9/2012 | Musil |
| 2012/0254774 A1 | 10/2012 | Patton |
| 2012/0259791 A1 | 10/2012 | Zoidze |
| 2012/0276848 A1 | 11/2012 | Krattiger |
| 2012/0276918 A1 | 11/2012 | Krattiger |
| 2012/0323687 A1 | 12/2012 | Schuster |
| 2012/0330959 A1 | 12/2012 | Kretz |
| 2013/0013713 A1 | 1/2013 | Shoham |
| 2013/0018957 A1 | 1/2013 | Parnaby |
| 2013/0051611 A1 | 2/2013 | Hicks |
| 2013/0054672 A1 | 2/2013 | Stilling |
| 2013/0060796 A1 | 3/2013 | Gilg |
| 2013/0073388 A1 | 3/2013 | Heath |

(56) References Cited

U.S. PATENT DOCUMENTS

| | | |
|---|---|---|
| 2013/0073389 A1 | 3/2013 | Heath |
| 2013/0073631 A1 | 3/2013 | Patton |
| 2013/0110631 A1 | 5/2013 | Mitchell |
| 2013/0110641 A1 | 5/2013 | Ormont |
| 2013/0124437 A1 | 5/2013 | Pennacchiotti |
| 2013/0131918 A1 | 5/2013 | Hahne |
| 2013/0132194 A1 | 5/2013 | Rajaram |
| 2013/0150015 A1 | 6/2013 | Valk |
| 2013/0159463 A1 | 6/2013 | Bentley |
| 2013/0201182 A1 | 8/2013 | Kuroki |
| 2013/0238599 A1 | 9/2013 | Burris |
| 2013/0238652 A1 | 9/2013 | Burris |
| 2013/0238658 A1 | 9/2013 | Burris |
| 2013/0268558 A1 | 10/2013 | Burris |
| 2013/0290554 A1 | 10/2013 | Chen |
| 2013/0325964 A1 | 12/2013 | Berberat |
| 2013/0346563 A1 | 12/2013 | Huang |
| 2014/0025911 A1 | 1/2014 | Sims |
| 2014/0040371 A1 | 2/2014 | Gurevich |
| 2014/0089296 A1 | 3/2014 | Burris |
| 2014/0089343 A1 | 3/2014 | Burris |
| 2014/0089461 A1 | 3/2014 | Harris |
| 2014/0095509 A1 | 4/2014 | Patton |
| 2014/0164368 A1 | 6/2014 | Mitchell |
| 2014/0195918 A1 | 7/2014 | Friedlander |
| 2014/0207893 A1 | 7/2014 | Harris |
| 2014/0222950 A1 | 8/2014 | Rabel |
| 2014/0236882 A1 | 8/2014 | Rishe |
| 2014/0256355 A1 | 9/2014 | Harris |
| 2014/0258451 A1 | 9/2014 | Harris |
| 2014/0259113 A1 | 9/2014 | Harris |
| 2014/0274148 A1 | 9/2014 | Harris |
| 2014/0280103 A1 | 9/2014 | Harris |
| 2014/0280278 A1 | 9/2014 | Harris |
| 2014/0280569 A1 | 9/2014 | Harris |
| 2014/0297740 A1 | 10/2014 | Narayanan |
| 2015/0019648 A1 | 1/2015 | Harris |
| 2015/0019866 A1 | 1/2015 | Braness |
| 2015/0020208 A1 | 1/2015 | Harris |
| 2015/0032739 A1 | 1/2015 | Harris |
| 2015/0172396 A1 | 6/2015 | Longo |
| 2015/0256632 A1 | 9/2015 | Harris |
| 2015/0381380 A1 | 12/2015 | Harris |
| 2016/0006783 A1 | 1/2016 | Harris |
| 2016/0014219 A1 | 1/2016 | Harris |
| 2016/0182656 A1 | 6/2016 | Harris |
| 2016/0219403 A1 | 7/2016 | Harris |
| 2016/0283561 A1 | 9/2016 | Harris |

FOREIGN PATENT DOCUMENTS

| | | |
|---|---|---|
| EP | 2293566 A2 | 3/2011 |
| WO | 9915995 A1 | 4/1999 |
| WO | 2010049918 A1 | 5/2010 |
| WO | 2013133870 A2 | 9/2013 |
| WO | 2013134451 A1 | 9/2013 |

OTHER PUBLICATIONS

Bao, Jie, et al.. "GeoFeed: A Location-Aware News Feed System", IEEE Xplore Digital Library, Published in 2012 IEEE 28th International Conference on Data Engineering, Apr. 1-5, 2012, 14 pages.

Chow et al., "Towards Location-Based Social Networking Services", LBSN 2010 Proceedings of the 2nd ACM SISPATIAL International Workshop on Location Based Social Networks, Nov. 2, 2010, pp. 31-38.

Lee et al., "Tag-Geotag Correlation in Social Networks", Proceedings of the 2008 ACM Workshop on Search in Social Media, 2008, pp. 59-66.

Sarwat, Mohamed, et al., "Sindbad: A Location-Based Social Networking System", SIGMOD '12, Scottsdale, Arizona, May 20-24, 2012, 4 pages.

U.S. Appl. No. 13/788,843, a Notice of Allowance, mailed Dec. 3, 2015, 18 pages.

U.S. Appl. No. 14/500,881, a non-final Office Action, mailed Sep. 21, 2015, 5 pages.

U.S. Appl. No. 13/284,455, a non-final Office Action, mailed Jan. 7, 2013, 18 pages.

U.S. Appl. No. 13/284,455, a non-final Office Action, mailed Jun. 4, 2013, 28 pages.

U.S. Appl. No. 13/284,455, a Notice of Allowance, mailed Oct. 4, 2013, 17 pages.

U.S. Appl. No. 13/619,888, a non-final Office Action, mailed Mar. 1, 2013, 15 pages.

U.S. Appl. No. 13/619,888, a Notice of Allowance, mailed Jul. 9, 2013, 10 pages.

U.S. Appl. No. 13/708,404, a Notice of Allowance, mailed May 24, 2013, 12 pages.

U.S. Appl. No. 13/708,466, a non-final Office Action, mailed Apr. 17, 2013, 15 pages.

U.S. Appl. No. 13/708,466, a Notice of Allowance, mailed Sep. 3, 2013, 11 pages.

U.S. Appl. No. 13/708,516, a non-final Office Action, mailed May 15, 2013, 11 pages.

U.S. Appl. No. 13/708,516, a Notice of Allowance, mailed Jun. 7, 2013, 14 pages.

U.S. Appl. No. 13/788,760, a Notice of Allowance, mailed Jul. 26, 2013, 12 pages.

U.S. Appl. No. 13/788,843, a final Office Action, mailed Jan. 21, 2014, 25 pages.

U.S. Appl. No. 13/788,843, a non-final Office Action, mailed Aug. 5, 2013, 17 pages.

U.S. Appl. No. 13/788,843, a non-final Office Action, mailed Feb. 20, 2015, 26 pages.

U.S. Appl. No. 13/788,909, a non-final Office Action, mailed Aug. 12, 2013, 17 pages.

U.S. Appl. No. 13/788,909, a Notice of Allowance, mailed Jan. 24, 2014, 12 pages.

U.S. Appl. No. 13/788,909, a Notice of Allowance, mailed Jun. 24, 2014, 11 pages.

U.S. Appl. No. 13/843,832, a non-final Office Action, mailed Sep. 13, 2013, 12 pages.

U.S. Appl. No. 13/843,832, a Notice of Allowance, mailed Jan. 24, 2014, 6 pages.

U.S. Appl. No. 13/843,832, a Notice of Allowance, mailed May 20, 2014, 7 pages.

U.S. Appl. No. 13/843,949, a non-final Office Action, mailed Aug. 29, 2013, 12 pages.

U.S. Appl. No. 13/843,949, a Notice of Allowance, mailed Feb. 3, 2014, 11 pages.

U.S. Appl. No. 13/843,949, a Notice of Allowance, mailed May 9, 2014, 10 pages.

U.S. Appl. No. 14/089,631, a final Office Action, mailed Jan. 2, 2015, 8 pages.

U.S. Appl. No. 14/089,631, a non-final Office Action, mailed Jul. 8, 2014, 21 pages.

U.S. Appl. No. 14/089,631, a Notice of Allowance, mailed Feb. 2, 2015, 10 pages.

U.S. Appl. No. 14/108,301, a non-final Office Action, mailed Sep. 11, 2014, 10 pages.

U.S. Appl. No. 14/108,301, a Notice of Allowance, mailed Feb. 20, 2015, 13 pages.

U.S. Appl. No. 14/164,362, a non-final Office Action, mailed Oct. 23, 2014, 15 pages.

U.S. Appl. No. 14/164,362, a Notice of Allowance, mailed Feb. 24, 2015, 22 pages.

U.S. Appl. No. 14/180,473, a final Office Action, mailed Jan. 5, 2015, 7 pages.

U.S. Appl. No. 14/180,473, a non-final Office Action, mailed Jul. 8, 2014, 18 pages.

U.S. Appl. No. 14/180,473, a Notice of Allowance, mailed Jan. 27, 2015, 8 pages.

U.S. Appl. No. 14/180,845, a final Office Action, mailed Feb. 22, 2016, 43 pages.

(56) References Cited

OTHER PUBLICATIONS

U.S. Appl. No. 14/180,845, a final Office Action, mailed Feb. 25, 2015, 32 pages.
U.S. Appl. No. 14/180,845, a non-final Office Action, mailed Aug. 27, 2015, 43 pages.
U.S. Appl. No. 14/180,845, a non-final Office Action, mailed Oct. 23, 2014, 32 pages.
U.S. Appl. No. 14/215,612, a final Office Action, mailed Nov. 28, 2014, 31 pages.
U.S. Appl. No. 14/215,612, a non-final Office Action, mailed Jul. 11, 2014, 16 pages.
U.S. Appl. No. 14/215,612, a non-final Office Action, mailed Aug. 18, 2015, 27 pages.
U.S. Appl. No. 14/500,832, a non-final Office Action, mailed May 21, 2015, 13 pages.
U.S. Appl. No. 14/500,881, a non-final Office Action, mailed Dec. 21, 2015, 24 pages.
U.S. Appl. No. 14/512,293, a Final Office Action, mailed Apr. 6, 2016, 9 pages.
U.S. Appl. No. 14/512,293, a final Office Action, mailed Aug. 14, 2015, 15 pages.
U.S. Appl. No. 14/512,293, a non-final Office Action, mailed Dec. 9, 2015, 14 pages.
U.S. Appl. No. 14/512,293, a non-final Office Action, mailed Jan. 28, 2015, 18 pages.
U.S. Appl. No. 14/666,056, a Final Office Action, mailed Jan. 4, 2016, 11 pages.
U.S. Appl. No. 14/666,056, a non-final Office Action, mailed Aug. 10, 2015, 17 pages.
U.S. Appl. No. 14/733,715, a non-final Office Action, mailed Mar. 11, 2016, 25 pages.
U.S. Appl. No. 14/792,538, a non-final Office Action, mailed Feb. 26, 2016, 20 pages.
U.S. Appl. No. 14/813,031, a final Office Action, mailed Mar. 21, 2016, 41 pages.
U.S. Appl. No. 14/813,031, a non-final Office Action, mailed Nov. 24, 2015, 23 pages.
U.S. Appl. No. 14/813,039, a Final Office Action, mailed May 16, 2016, 14 pages.
U.S. Appl. No. 14/813,039, a non-final Office Action, mailed Jan. 20, 2016, 20 pages.
U.S. Appl. No. 14/180,845, a non-final Office Action, mailed Jul. 7, 2016, 51 pages.
U.S. Appl. No. 14/733,715, a Final Office Action, mailed Aug. 17, 2016, 21 pages.
U.S. Appl. No. 15/018,767, a non-final Office Action, mailed Jun. 6, 2016, 19 pages.
U.S. Appl. No. 15/241,836, a non-final Office Action, mailed Oct. 7, 2016, 38 pages.

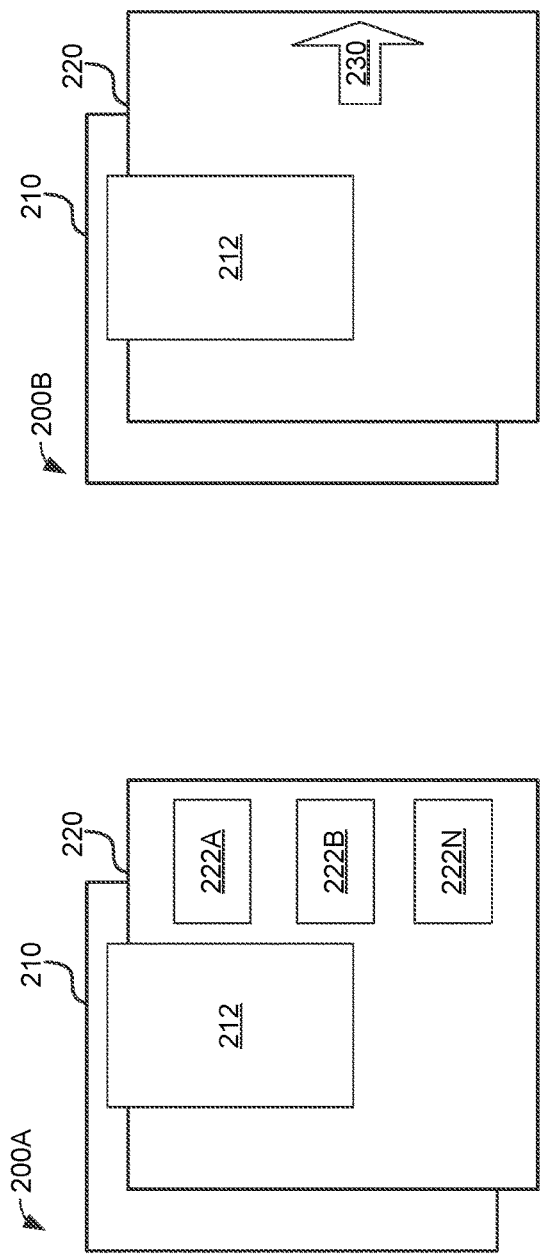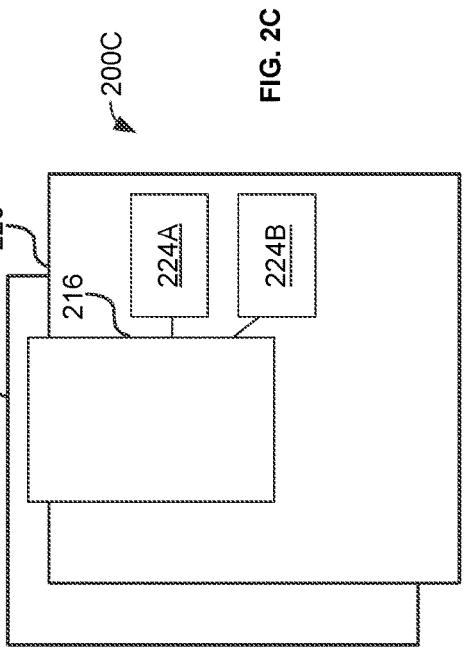

VIEW OF A PHYSICAL SPACE AUGMENTED WITH SOCIAL MEDIA CONTENT ORIGINATING FROM A GEO-LOCATION OF THE PHYSICAL SPACE

RELATED APPLICATIONS

This application is a continuation of U.S. patent application Ser. No. 14/215,612, entitled "VIEW OF A PHYSICAL SPACE AUGMENTED WITH SOCIAL MEDIA CONTENT ORIGINATING FROM A GEO-LOCATION OF THE PHYSICAL SPACE," filed Mar. 17, 2014, which claims priority to U.S. Provisional Patent Application No. 61/800,951, filed Mar. 15, 2013, the content of which is hereby incorporated by reference in its entirety.

FIELD OF THE INVENTION

The disclosure relates to systems and methods for augmenting a view of a physical space at a geographically definable location with social media and/or other content originating from the geographically definable location.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively monitored and/or selectively displayed.

Because of the vast amount of information and different ways in which to communicate with users, it can be difficult to communicate with creators of the content.

SUMMARY OF THE INVENTION

The disclosure relates to systems and methods for augmenting a view of a physical space of one or more geographically definable locations ("geo-locations") with social media and/or other content originating from the one or more geo-locations. Generally speaking, the system may include a computing device having one or more processors programmed to augment (e.g., add to, overlay, embed, etc.) the view of the physical space of a geo-location with social media content, thereby allowing a user to view a physical space at a geo-location along with social media content that was created from the geo-location.

The one or more processors may be programmed by one or more computer program modules. For example, the one or more processors may be configured to execute a geofeed creation module, a content context module, a reality context module, an augmented reality module, an administration module, a communication module, a user interface module, and/or other modules. The geofeed creation module may be configured to obtain the social media content from one or more social media content providers.

In some implementations, the content context module may be configured to obtain (e.g., receive, retrieve, or determine) contextual information that describes the context in which the social media content was created. The contextual information for the content may include a geo-location, an ambient condition (e.g., temperature), an altitude, a motion or orientation based on sensor measurements from a device used to create the content, and/or other information that describes the context in which the social media content was created. Content context module may be configured to obtain the contextual information from the content itself, such as when the contextual information is available as Exchangeable Image File ("EXIF") data embedded in images, from the social media content provider, and/or from other sources (e.g., from a user who created the content).

The computer may be configured to determine social media content that is to augment the view of the physical space based on one or more of the contextual information. The social media content may be filtered in and/or out using various geofeed parameters (e.g., hashtags, identification of types of content, content providers, etc.) described herein. Thus, a user may indicate that certain content be included for and/or excluded from consideration for augmenting the view of the physical space.

In some implementations, the reality context module may be configured to obtain contextual information that describes the context of a view of a physical space. The view of the physical space may include an image being displayed in real-time through a camera lens (e.g., through a display that displays a scene being captured by imaging sensors of a camera, an image that is stored and displayed (e.g., a photograph), and/or other views of a physical space. Contextual information that describes the context of a view of a physical space may include information similar to contextual information that describes social media content. For example, the contextual information that describes the context of the view of the physical space may include a geo-location of the physical space (e.g., a current location for real-time implementations and a location at which the view was taken for stored implementations) and/or other contextual information.

Reality context module may be configured to obtain the reality contextual information from real-time measurements/information (e.g., location information from location sensors, temperature from temperature sensors, etc.). In some implementations, the reality context module may obtain the location based on image recognition of image features such as buildings, structures, and/or other identifiable objects taken from the view of the physical space.

In some implementations, the augmented reality module may compare one or more of the content contextual information from content context module and one or more of the reality contextual information from reality context module. The augmented reality module may determine a match (which may be exact or inexact) between the content contextual information and the reality contextual information from reality context module.

Upon determining a match, the augmented reality module may augment the view of the physical space of the geo-location. For example, a location at which the social media content was created may be compared to a geo-location of the physical space being viewed. The augmented reality module may determine that the social media content was created from the geo-location of the physical space being viewed and augment the view of the physical space with the social media content. Other contextual information may be used instead of or in addition to the location information to determine whether social media content should be used to augment the view of the physical space.

Some or all of the processing related to the content context module, the reality context module, and the augmented reality module may be performed at a device used to display the view of the physical space and/or at another device.

By way of example only, in operation, a user may look at a display of the user's mobile device that displays a view of a building and its surroundings at a geo-location, where the view is imaged with a camera of the user's mobile device (the view may be a picture/video or a live shot of the building and its surroundings). At the mobile device and/or at a remote device, reality contextual information that describes the geo-location may be obtained and social media content may be identified based on a comparison between content contextual information and the reality contextual information. For example, the mobile device and/or the remote device may identify social media content that was created from the geo-location of the building and its surroundings being viewed. The mobile device may then augment the view of the buildings and its surroundings with the identified social media content, thereby enhancing the user's view of the physical space.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates an example of a user interface for displaying an augmented view of a physical space of one or more geo-locations with social media and other content originating from the one or more geo-locations, according to an aspect of the invention.

FIG. 2B illustrates an example of a user interface for displaying an augmented view of a physical space of one or more geo-locations with social media and other content originating from the one or more geo-locations, according to an aspect of the invention.

FIG. 2C illustrates an example of a user interface for displaying an augmented view of a physical space of one or more geo-locations with social media and other content originating from the one or more geo-locations, according to an aspect of the invention.

DETAILED DESCRIPTION OF THE INVENTION

Figure 1:
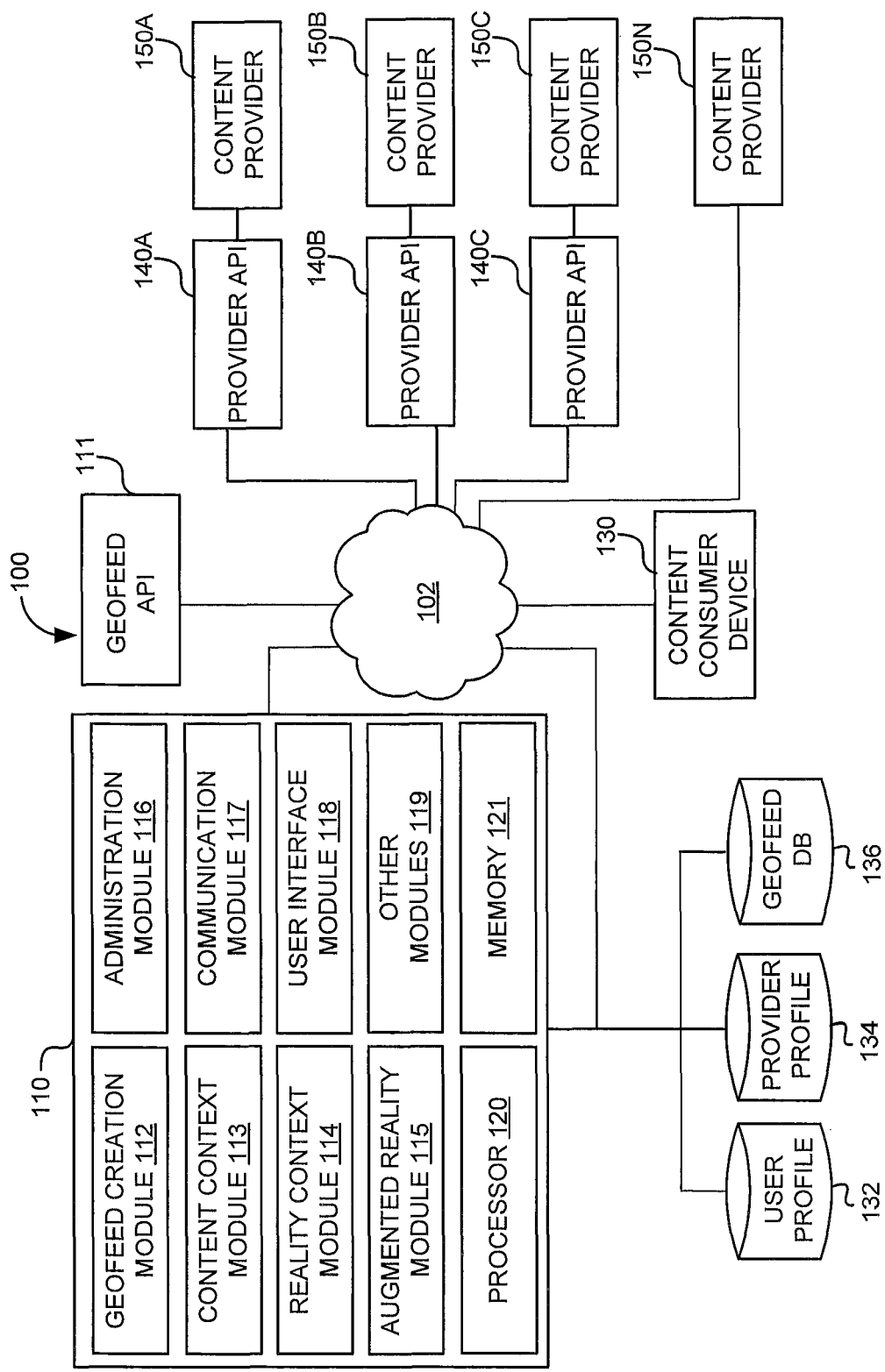
FIG. 1 illustrates a system configured to augment a view of a physical space of one or more geo-locations with social media and other content originating from the one or more geo-locations, according to an aspect of the invention.

FIG. 1 illustrates a system 100 of targeted messaging, workflow management, and digital rights management for geofeeds, according to an aspect of the invention. A geofeed includes a collection of content (also referred to herein as "geofeed content"), aggregated from various content providers, that is relevant to a geographically definable location (hereinafter, a "geo-location"). The content providers may include, for example, social media providers (e.g., FACEBOOK, TWITTER, INSTAGRAM, FLICKR, etc.), online knowledge databases, and/or other providers that can distribute content that may be relevant to a geo-location. The social media providers may include social media platforms that allow a user who is registered with the social media platform to upload content and share the content with others who have signed up to be associated with the user.

The geo-location may be specified by a boundary, geo coordinates (e.g., latitude, longitude, altitude/depth), an address, a school, a place name, a point of interest, a zip code, a city, a state, a country, and/or other information that can spatially identify an area. The content may be generated by content sources such as individuals, corporations, and/or other entities that may create content. As used hereinafter, "a location," "a geo-location," "a geographically definable location," and similar language is not limited to a single location but may also refer to one or more such locations.

In many instances the content can be automatically tagged with information. The information may include a user identification, date/time information related to the content (e.g., a date and/or time that indicates when the content was created, uploaded, etc.), geographic information that specifies a location where the content was created, uploaded, etc., and/or other information. For example, cameras equipped with a Global Positioning Satellite ("GPS") unit and/or other location-aware system may embed into an image file latitude/longitude coordinates that indicate where a picture was taken. In addition, modern hand-held devices such as smartphones may be equipped with a GPS sensor, which allows users to generate content with their devices and share the content through a plurality of social networks and other providers. Moreover, some devices allow users to manually input the foregoing and other information for embedding into the content. Furthermore, editing software may allow a user to embed or otherwise manually and/or automatically include information along with the content after the content was created.

System 100 may include a computer 110, a geofeed API 111, a content consumer device 130, provider APIs 140, content providers 150, and/or other components. In some embodiments, computer 110 may include one or more processors 120 configured to perform some or all of a functionality of a plurality of modules, which may be stored in a memory 121. For example, the one or more processors 120 may be configured to execute a geofeed creation module 112, a content context module 113, a reality context module 114, an augmented reality module 115, an administration module 116, a communication module 117, a user interface module 118, and/or other modules 119. Geofeed API 111 may be used to interface with computer 110 to interface with computer 110 in relation to the geofeeds.

Geofeed creation module 112 may be configured to create one or more geofeeds, as described in U.S. patent application Ser. No. 13/284,455 (issued on Feb. 18, 2014 as U.S. Pat. No. 8,655,873), filed Oct. 28, 2011, entitled "SYSTEM AND METHOD FOR AGGREGATING AND DISTRIBUTING GEOTAGGED CONTENT," and U.S. patent application Ser. No. 13/619,888 (issued on Nov. 26, 2013 as U.S. Pat. No. 8,595,317), filed Sep. 14, 2012, entitled "SYSTEM AND METHOD FOR GENERATING, ACCESSING, AND UPDATING GEOFEEDS" both of which are incorporated by reference herein in their entireties.

U.S. patent application Ser. No. 13/708,516 (issued on Feb. 18, 2014 as U.S. Pat. No. 8,655,983), filed Dec. 7, 2012, entitled "SYSTEM AND METHOD FOR LOCATION MONITORING BASED ON ORGANIZED GEOFEEDS," U.S. patent application Ser. No. 13/708,466 (issued on Jan. 28, 2014 as U.S. Pat. No. 8,639,767), filed Dec. 7, 2012, entitled "SYSTEM AND METHOD FOR GENERATING AND MANAGING GEOFEED-BASED ALERTS," U.S. patent application Ser. No. 13/708,404 (issued on Jul. 9, 2013 as U.S. Pat. No. 8,484,224), filed Dec. 7, 2012, entitled "SYSTEM AND METHOD FOR RANKING GEOFEEDS AND CONTENT WITHIN GEOFEEDS," U.S. patent application Ser. No. 13/788,843 (issued on Apr. 5, 2016 as U.S. Pat. No. 9,307,353), filed Mar. 7, 2013, entitled "SYSTEM AND METHOD FOR DIFFERENTIALLY PROCESSING A LOCATION INPUT FOR CONTENT PROVIDERS THAT USE DIFFERENT LOCATION INPUT FORMATS," U.S. patent application Ser. No. 13/788,760 (issued on Dec. 17, 2013 as U.S. Pat. No. 8,612,533), filed Mar. 7, 2013, entitled "SYSTEM AND METHOD FOR CREATING AND MANAGING GEOFEEDS," and U.S. patent application Ser. No. 13/788,909 (issued on Sep. 30, 2014 as U.S. Pat. No. 8,850,531), filed Mar. 7, 2013, entitled "SYSTEM AND METHOD FOR TARGETED MESSAGING, WORKFLOW MANAGEMENT, AND DIGITAL RIGHTS MANAGEMENT FOR GEOFEEDS," are all incorporated by reference in their entireties herein. are all incorporated by reference in their entireties herein.

U.S. patent application Ser. No. 13/843,949 (issued on Oct. 14, 2014 as U.S. Pat. No. 8,862,589), filed on Mar. 15, 2013, entitled "SYSTEM AND METHOD FOR PREDICTING A GEOGRAPHIC ORIGIN OF CONTENT AND ACCURACY OF GEOTAGS RELATED TO CONTENT OBTAINED FROM SOCIAL MEDIA AND OTHER CONTENT PROVIDERS," U.S. patent application Ser. No. 13/843,832 (issued on Sep. 30, 2014 as U.S. Pat. No. 8,849,935), filed on Mar. 15, 2013, entitled "SYSTEM AND METHOD FOR GENERATING THREE-DIMENSIONAL GEOFEEDS, ORIENTATION-BASED GEOFEEDS, AND GEOFEEDS BASED ON AMBIENT CONDITIONS," are all incorporated by reference in their entireties herein.

Geofeed creation module 112 may be configured to generate one or more geofeeds based on content that is relevant to one or more geographically definable locations ("geo-locations"). The geofeed creation module may format requests that specify one or more geo-locations specifically for individual ones of the plurality of content providers and aggregate the content to form a geofeed. In some embodiments, geofeed creation module 112 may create a single geofeed having a plurality of geo-locations that are grouped with respect to one another. In other embodiments, geofeed creation module 112 may create multiple distinct geofeeds, which may each be associated with one or more geo-locations and may be grouped with respect to one another. In these embodiments, each set of individual content may correspond to a single geofeed.

For example, geofeed creation module 112 may format requests to individual ones of a plurality of APIs 140 (illustrated in FIG. 1 as API 140A, 140B, . . . , 140N). The provider APIs 140 may facilitate receiving content from corresponding content providers 150 (illustrated in FIG. 1 as content providers 150A, 150B, 150C). In some embodiments, geofeed creation module 110 may format a request directly for content provider 150N without using a corresponding API. A content consumer device 130 may request and view geofeeds created by geofeed creation module 112. The formatting instructions may be stored in and recalled from a memory such as provider database 134. Preferences for creating, viewing, and/or managing information related to geofeeds may be stored in and recalled from a memory such as user profile database 132.

In some embodiments, geofeed creation module 112 may generate a geofeed definition that describes a geofeed such that a geofeed may be dynamically generated based on the geofeed definition. For example, the geofeed definition may include the geo-location specification, one or more geofeed parameters used to filter content aggregated from content providers 150, and/or other information related to the geofeed that can be used to aggregate content from various content providers. For example, the one or geofeed parameters may be used to view only particular types of content, content from particular content providers, and/or other parameter by which to filter in or out content. The geofeed definition may be identified by a geofeed identifier and stored (e.g., in database 136) for later retrieval so that a content consumer or others may select and obtain a geofeed that was previously defined.

In some embodiments, geofeed creation module 112 may store the geofeed (e.g., in database 136). For example, geofeed creation module 112 may be configured to store the geofeed by aggregating content from content providers 150 in relation to the geofeed and store the content in association with a geofeed identifier and/or a geofeed definition.

In some embodiments, geofeed creation module 112 may use the credentials of a user for social media or other platform to access content. In this manner, geofeed creation module 112 may obtain content from a content provider using the credentials of the user. For example, geofeed creation module 112 may obtain from the user a username and password (with permission from the user) for the user's TWITTER account and obtain content from TWITTER to which the user has access.

In some implementations, content context module 113 may be configured to obtain (e.g., receive, retrieve, or determine) contextual information that describes the context in which the social media content was created. The contextual information for the content may include a geo-location, an ambient condition (e.g., temperature), an altitude, a motion or orientation based on sensor measurements from a device used to create the content, and/or other information that describes the context in which the social media content was created. Content context module may be configured to obtain the contextual information from the content itself, such as when the contextual information is available as Exchangeable Image File ("EXIF") data embedded in images, from the social media content provider, and/or from other sources (e.g., from a user who created the content).

The computer may be configured to determine social media content that is to augment the view of the physical space based on one or more of the contextual information. The social media content may be filtered in and/or out using various geofeed parameters (e.g., hashtags, identification of types of content, content providers, etc.) described herein. Thus, a user may indicate that certain content be included for and/or excluded from consideration for augmenting the view of the physical space.

In some implementations, reality context module 114 may be configured to obtain contextual information that describes the context of a view of a physical space. The view of the physical space may include an image being displayed in real-time through a camera lens (e.g., through a display that displays a scene being captured by imaging sensors of a camera), an image that is stored and displayed (e.g., a photograph), and/or other views of a physical space. Contextual information that describes the context of a view of a physical space may include information similar to contextual information that describes social media content. For example, the contextual information that describes the context of the view of the physical space may include a geo-location of the physical space (e.g., a current location for real-time implementations and a location at which the view was taken for stored implementations) and/or other contextual information.

Reality context module 114 may be configured to obtain the reality contextual information from real-time measurements/information (e.g., location information from location sensors, temperature from temperature sensors, etc.). In some implementations, reality context module 114 may obtain the location based on image recognition of image features such as buildings, structures, and/or other identifiable objects taken from the view of the physical space.

In some implementations, augmented reality module 115 may be configured to compare one or more of the content contextual information from content context module and one or more of the reality contextual information from reality context module. Augmented reality module 115 may determine a match (which may be exact or inexact) between the content contextual information and the reality contextual information from reality context module.

Upon determining a match, augmented reality module 115 may augment the view of the physical space of the geo-location. For example, a location at which the social media content was created may be compared to a geo-location of the physical space being viewed. Augmented reality module 115 may determine that the social media content was created from the geo-location of the physical space being viewed and augment the view of the physical space with the social media content. Other contextual information may be used instead of or in addition to the location information to determine whether social media content should be used to augment the view of the physical space.

In some implementations, for example, augmented reality module 115 may be configured to compare other contextual information and/or combinations of contextual information such as, for example, ambient conditions, orientations, motion (e.g., motion of a device such as a camera device used to create the content), altitude, and/or other contextual information.

Some or all of the processing related to content context module 113, reality context module 114, and augmented reality module 115 may be performed at a device used to display the view of the physical space and/or at another device.

In some embodiments, administration module 116 may be configured to manage user accounts, set user roles such as security access roles, and/or perform other administrative operations. For example, the administration module may be used to define which users may generate messages using the unified message module, generate workflow items, view workflow items of others, annotate content, enter into agreements with respect to ownership rights of the content, and/or set other user roles.

In some embodiments, communication module 117 may be configured to share a geofeed via a content provider such as a social media provider, email, SMS text, and/or other communication channels. In some embodiments, the communication module may be configured to communicate a geofeed via various feeds such as Really Simple Syndication ("RSS") and ATOM feeds, a vanity Uniform Resource Locator ("URL") using a name of the geofeed (e.g., a name assigned by the content consumer), and/or other communication channels.

In some embodiments, the user interface module 118 may be configured to generate user interfaces that allow viewing and interaction with augmented views of physical spaces. Examples of such user interfaces are illustrated in FIGS. 2A-C. User interface module 118 may also present various displays for sending/receiving messages, managing workflows, managing information related to ownership rights of the content, displaying geofeeds, requesting geofeeds, and/or otherwise displaying information related to the content.

Those having skill in the art will recognize that computer 110 and content consumer device 130 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 130. In one implementation, computer 110 and consumer device 130 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Various inputs, outputs, configurations, and/or other information described herein as being stored or storable may be stored in one or more databases (not illustrated in FIG. 1). Such databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

FIG. 2A illustrates an example of a user interface 200A for displaying an augmented view of a physical space of one or more geo-locations with social media and/or other content originating from the one or more geo-locations, according to an aspect of the invention. The user interfaces illustrated in FIGS. 2A-2C are for illustrative purposes only. Various components may be added, deleted, moved, or otherwise changed so that the configuration, appearance, and/or content of the screenshots may be different than as illustrated in the Figures. Accordingly, the graphical user interface objects as illustrated (and described in greater detail below) are exemplary by nature and, as such, should not be viewed as limiting.

User interface 200A may display a view of a physical space 210 augmented by an augmented reality ("AR") space 220. AR space 220 may be overlaid onto, embedded within, or otherwise displayed alongside physical space 210 (e.g., a real-world space) such that graphical objects displayed on AR space 220 coincides with locations on physical space 210. In this manner, graphical objects on AR space 220 may appear to be associated with physical objects (e.g., real-world objects) in physical space 210. Physical space 210 and AR space 220 are illustrated as being separate solely for convenience of illustration.

A physical object 212 and its surroundings may be presented in a view of the physical space. Reality context module 114 (illustrated in FIG. 1) may obtain reality contextual information related to the view of physical object 212 and/or the geo-location where the physical object is located.

For example, reality context module 114 may determine that physical object 212 is located at a particular geo-location. As described herein, the particular geo-location may be determined based on conventional location techniques associated with a device that is displaying user interface 200A. For example, the device may include GPS sensors and/or other devices that can be used for localization. In some implementations, physical object 212 and/or other feature of physical space 210 may be used to determine the particular geo-location such as by image recognition and comparison to a database of known objects, for example.

Whichever location technique is used, augmented reality module 115 may identify social media and/or other content that was created from the particular geo-location. Users may have posted social media content to one or more social media providers from the particular geo-location. Augmented reality module 115 may identify or otherwise obtain such social media content and provide user interface 200A with the content. For example, user interface module 118 may include AR objects 222 (illustrated in FIG. 2A as AR objects 222A, 222B, . . . , 222N) corresponding to the social media content that was created from the particular geo-location. An AR object 222 when clicked or otherwise selected may cause user interface 200A to provide additional or detailed in information related to the corresponding social media content. Space permitting, the social media content may be displayed within AR object 222. If too many AR objects are included, they may be merged into an AR object 222.

In some implementations, if information that indicates that a particular social media content item was created from or nearby physical object 212, a corresponding AR object 222 may be positioned on AR space 220 to correspond to physical object, thereby providing the user with an indication of this.

FIG. 2B illustrates an example of a user interface 200B for displaying an augmented view of a physical space of one or more geo-locations with social media and/or other content originating from the one or more geo-locations, according to an aspect of the invention.

User interface 200B may provide a view of physical space 210 augmented with AR space 220. Physical object 212 may be visible in the augmented view. In the illustrated implementation, user interface 200B may include an indicator 230 that indicates that social media content was created at the direction indicated. For example, reality context module 114 may determine an orientation of the device being used to display user interface 200B. Such orientation may be determined based on sensor information from gyroscopes, accelerometers, magnetometers, and/or other sensors.

Augmented reality module 115 may determine content created from a geo-location of the physical space and, for example, an orientation at which the content was created. Augmented reality module 115 may determine that social media content is nearby a user's location but was created in an orientation that is different from the orientation of the device that is displaying user interface 200B.

Indicator 230 may indicate the direction of where social media content was created. For example, indicator 230 may indicate that social media content was posted while the user who posted the content was in an orientation that is in a direction as indicated by the indicator. In other words, if the device that displays user interface 200B turns in the direction indicated by indicator 230, the social media content will be made visible in AR space 220. In this manner, a user may explore a given scenery to determine what previous users may have posted about the given scenery observed from the same perspective (e.g., orientation). For example, hobbyists such as stargazers may gain insight into what previous stargazers may have been observing from a particular vantage point and orientation (e.g., zenith, azimuth, etc.) toward the sky. Tourists may view what others have posted about a particular scenic view or attraction.

FIG. 2C illustrates an example of a user interface 200C for displaying an augmented view of a physical space of one or more geo-locations with social media and other content originating from the one or more geo-locations, according to an aspect of the invention. User interface 200C may provide a view of physical space 210 augmented with AR space 220. Physical object 216 may be visible in the augmented view. In the illustrated implementation, physical object 216 may be a building having multiple floors, which are individually associated with different altitudes. Reality context module 114 may recognize physical object 216 based on conventional image recognition techniques and estimate a location for each floor by, for example, recognizing windows or other floor-level indicating features. Reality context module 114 may then assign altitudes for each floor based on predefined estimates distance per floor (e.g., 12 feet per floor).

Augmented reality module 115 may determine content created from physical object 216 and, for example, at which altitude. Augmented reality module 115 may correlate the altitude at which the social media and/or other content was created with the altitude of the physical object 216. Based on the correlation, augmented reality module 115 may cause AR objects 224 corresponding to the social media and/or other content to be displayed at their respective altitudes on physical object 216. For example, hotel or commercial building owners may post social media content (which may include marketing or other branded materials) from their respective buildings at different floors. User interface 200C may be used to then view the building augmented with the social media posts such that a passerby or other interested users may image the building and obtain an augmented image. Other uses are contemplated as well. For example, a user may enter the building and travel to various floors and receive an augmented view of each floor based on social media content that was posted from that particular building and that particular floor. Furthermore, although illustrated as a building, physical object 216 may include other types of structures for which different altitudes may be estimated and/or traversed for augmented views of the physical object.

Figure 3:
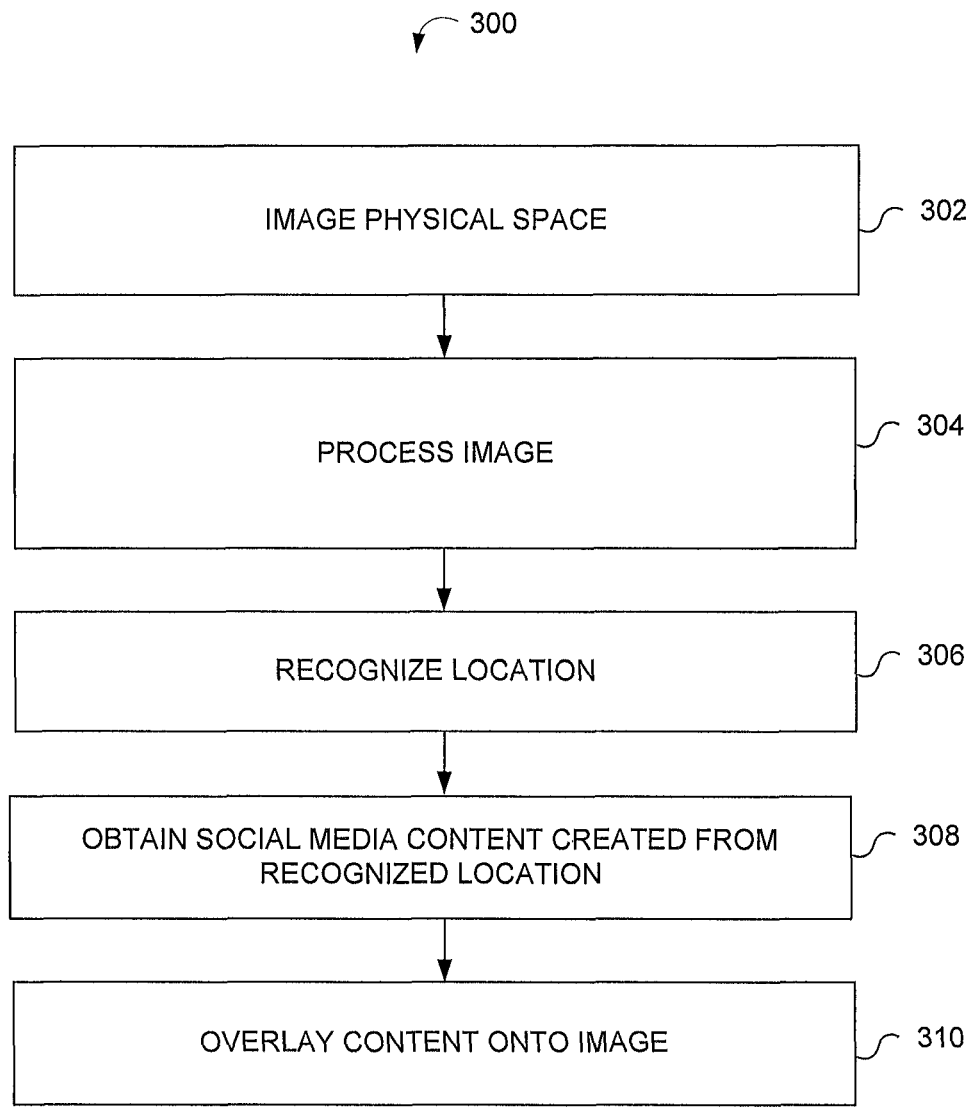
FIG. 3 illustrates a process for augmenting a view of a physical space of geo-locations with social media and other content originating from the one or more geo-location, according to an aspect of the invention.

FIG. 3 illustrates a process 300 for augmenting a view of a physical space of geo-locations with social media and/or other content originating from the one or more geo-location, according to an aspect of the invention. The various processing operations and/or data flows depicted in FIG. 3 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, a view of the particular scenery may be obtained (e.g., photographed, videographed, imaged live, etc.). In an operation 304, the imaged scenery may be processed. For example, one or more features in the scenery may be processed using conventional image processing techniques to recognize a location. A location may be recognized based the processing in an operation 306. For example, a landmark such as the Empire State Building may be recognized and a location for the landmark may be obtained.

In an operation 308, content created from the location may be obtained. In an operation 310, the content may be used to augment the view of the particular scenery with graphical elements that represent the content created from the location.

Figure 4:
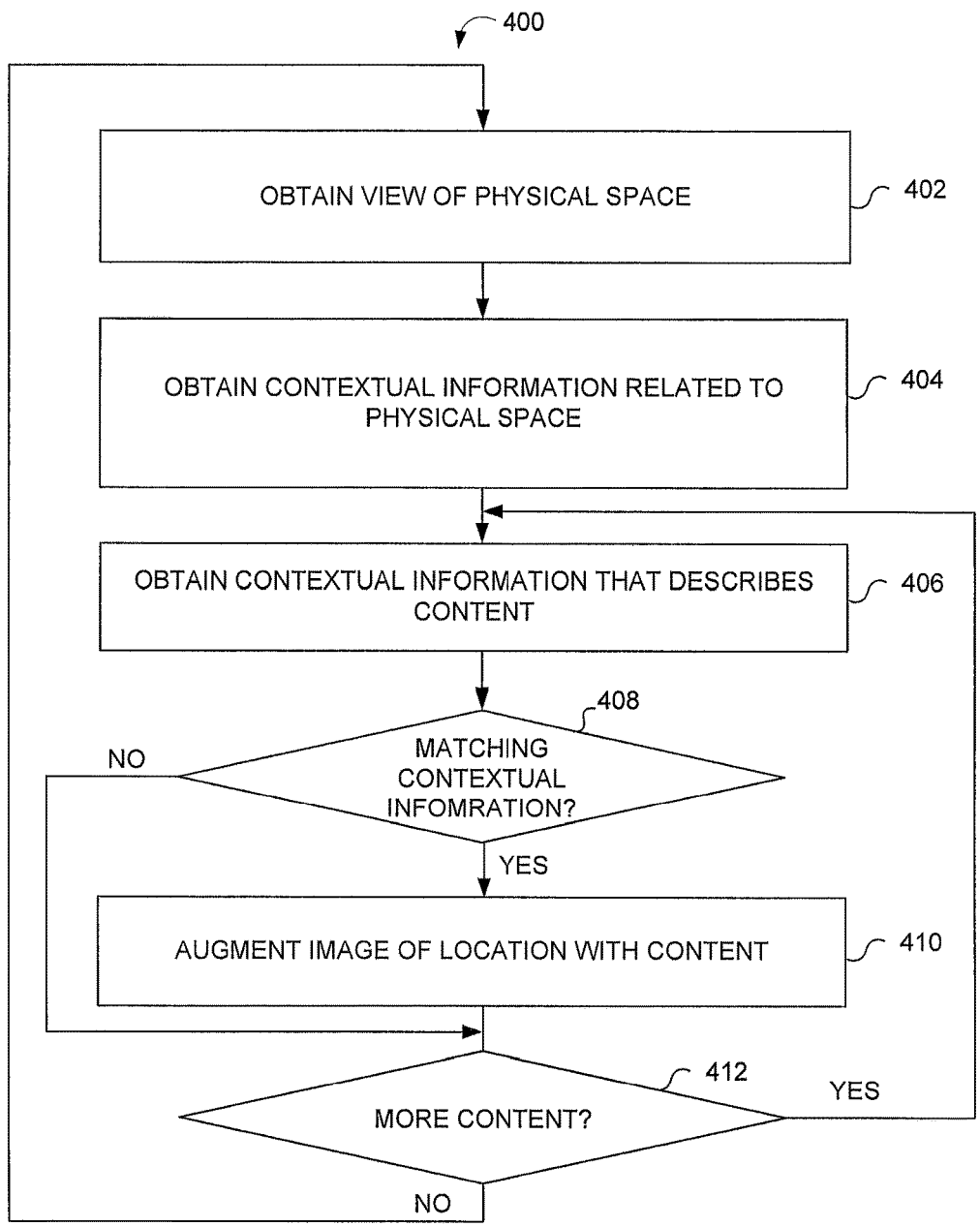
FIG. 4 illustrates a process of comparing the context of content with the context of a physical space to be augmented with the content, according to an aspect of the invention.

FIG. 4 illustrates a process 400 of comparing contextual information of content with contextual information of a physical space to be augmented with the content, according to an aspect of the invention.

In an operation 402, a view of a physical space may be obtained (e.g., photographed, videographed, imaged live, etc.). In an operation 404, contextual information related to the physical space may be obtained. The reality contextual information may include a geo-location, an ambient condition, an altitude, and/or other reality contextual information may be obtained. For example, if the physical space has been imaged and stored as a photograph, the contextual information may be obtained from EXIF data or other data source that describes the image and/or the physical space. On the other hand, if the physical space is being currently imaged (e.g., live), then the reality contextual information may be obtained from one or more sensors on-board the device used to image the physical space, other sensors, inputs by an operator of the device, and/or other source of reality contextual information.

In an operation 406, contextual information that describes the content (e.g., social media content) may be obtained. In an operation 408, a determination of whether contextual information of the content matches the reality contextual information. Such matching may be exact or in-exact (e.g., within a predefined and/or configurable threshold) and may include matching location, orientation, ambient conditions, altitude, and/or other contextual information that can be automatically measured or determined. In some implementations, such matching may include matching information provided by users.

If a match is found, the view of the physical space may be augmented with graphical objects representative of the content whose contextual information matches the reality contextual information in an operation 410. Processing may then proceed to an operation 412, where a determination of whether more content is available for processing is made. If more content is available, processing may return to operation 406.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for augmenting a view of a physical space at a geographically definable location with social media content originating from the geographically definable location, wherein the augmented view includes an augmented space that is coincident with the physical space, the system comprising:
one or more processors programmed by one or more computer program instructions that, when executed by the one or more processors, program the one or more processors to:
obtain (i) a real-time or stored image of the physical space corresponding to the geographically definable location and (ii) reality contextual information that describes a context of the physical space;
identify the geographically definable location associated with the physical space;
obtain (i) social media content that was created at the geographically definable location, and (ii) content contextual information that describes a context for the social media content, wherein the social media content comprises at least a first social media content item and the content contextual information comprises at least first content contextual information that describes a context in which the first social media content item was created;
compare the reality contextual information with the content contextual information;
determine a match between at least some of the reality contextual information and the content contextual information;
obtain a second orientation of a second device used to create the first social media content item based on the first content contextual information;
determine that the second orientation is different than an orientation of a first device to which the augmented view is provided such that a graphical representation of the first social media content item would not be in the augmented view;
cause an indication to be provided on the augmented view associated with the physical space that indicates a direction in which to move the first device to match the second orientation to bring the graphical representation of the first social media content item into the augmented view;
determine that the graphical representation of the first social media content item is in the augmented view;
cause the graphical representation of the first social media content item to be included in the augmented space that is coincident with the physical space such that the augmented view is augmented with the augmented space; and
cause the augmented view to be provided to the first device.

2. The system of claim 1, wherein the one or more processors are programmed to obtain the reality contextual information from one or more sensors that provide one or more sensor measurements with respect to the physical space.

3. The system of claim 2, wherein the one or more sensor measurements relate to the orientation of the first device that includes the one or more sensors, an ambient condition around the first device, and/or an altitude of the first device.

4. The system of claim 3, wherein to obtain the social media content that was created at the geographically definable location and the content contextual information that describes the context for the social media content, the one or more processors are further programmed to:

generate a first request to be provided to a first social media content provider, wherein the first request comprises a first specification of the geographically definable location in a first format specific to the first social media content provider;

generate a second request to be provided to a second social media content provider, wherein the second request comprises a second specification of the geographically definable location in a second format specific to the second social media content provider, the second format being different than the first format;

obtain at least the first social media content item relevant to the geographically definable location based on the first request, and the first content contextual information that describes the context in which the first social media content item was created; and obtain at least a second social media content item relevant to the geographically definable location based on the second request, and second content contextual information that describes a context in which the second social media content item was created.

5. The system of claim 4, wherein to determine a match between at least some of the reality contextual information and the content contextual information, the one or more processors are further programmed to:

determine that there exists a first match between at least some of the reality contextual information and the first content contextual information, wherein the first match indicates a match between the context of the physical space and the context in which the first social media content item was created; and determine that there exists a second match between at least some of the reality contextual information and the second content contextual information, wherein the second match indicates a match between the context of the physical space and the context in which the second social media content item was created.

6. The system of claim 5, wherein the one of more processors are further programmed to:

cause a second graphical representation of the second social media content item to be included in the augmented space responsive to a determination that there exists the second match between at least some of the reality contextual information and the second content contextual information.

7. The system of claim 2, wherein the one or more sensor measurements relate to an altitude of the first device that includes the one or more sensors, and wherein the one or more processors are further programmed to:

determine that the social media content was created at an altitude that is the same as the altitude of the first device.

8. The system of claim 2, wherein the one or more sensor measurements relate to an ambient condition of the first device that includes the one or more sensors, and wherein the one or more processors are further programmed to:

determine that the social media content was created at an ambient condition that is the same as the ambient condition of the first device.

9. The system of claim 2, wherein the one or more sensor measurements relate to an altitude of the first device that includes the one or more sensors and an ambient condition related to the device, and wherein the one or more processors are programmed to:

determine that the social media content was created at an altitude that is the same as the altitude of the first device; and determine that the social media content was created at an ambient condition that is the same as the ambient condition of the first device.

10. The system of claim 1, wherein to identify the geographically definable location associated with the physical space, the one or more processors are further programmed to:

recognize an object from the image of the physical space; and associate the recognized object with a recognized location, wherein the geographically definable location is determined based on the recognized object.

11. A method for augmenting a view of a physical space at a geographically definable location with social media content originating from the geographically definable location, wherein the augmented view includes an augmented space that is coincident with the physical space, the method being implemented on a computer having one or more processors programmed with one or more computer program instructions that, when executed by the one or more processors, cause the computer to perform the method, the method comprising:

obtaining, by the computer, (i) a real-time or stored image of the physical space corresponding to the geographically definable location and (ii) reality contextual information that describes a context of the physical space;

identifying, by the computer, the geographically definable location associated with the physical space;

obtaining, by the computer, (i) social media content that was created at the geographically definable location, and (ii) content contextual information that describes a context for the social media content, wherein the social media content comprises at least a first social media content item and the content contextual information comprises at least first content contextual information that describes a context in which the first social media content item was created;

comparing, by the computer, the reality contextual information with the content contextual information;

determining, by the computer, a match between at least some of the reality contextual information and the content contextual information;

obtaining, by the computer, a second orientation of a second device used to create the first social media content item based on the first content contextual information;

determining, by the computer, that the second orientation is different than an orientation of a first device to which the augmented view is provided such that a graphical representation of the first social media content item would not be in the augmented view;

causing, by the computer, an indication to be provided on the augmented view associated with the physical space that indicates a direction in which to move the first device to match the second orientation to bring the graphical representation of the first social media content item into the augmented view;

determining, by the computer, that the graphical representation of the first social media content item is in the augmented view;

causing, by the computer, the graphical representation of the first social media content item to be included in the augmented space that is coincident with the physical space such that the augmented view is augmented with the augmented space; and causing, by the computer, the augmented view to be provided to the first device.

12. The method of claim 11, wherein the one or more processors are programmed to obtain the reality contextual information from one or more sensors that provide one or more sensor measurements with respect to the physical space.

13. The method of claim 12, wherein the one or more sensor measurements relate to the orientation of the first device that includes the one or more sensors, an ambient condition around the first device, and/or an altitude of the first device.

14. The method of claim 13, wherein obtaining the social media content that was created at the geographically definable location and the content contextual information that describes the context for the social media content comprises:

generating, by the computer, a first request to be provided to a first social media content provider, wherein the first request comprises a first specification of the geographically definable location in a first format specific to the first social media content provider;

generating, by the computer, a second request to be provided to a second social media content provider, wherein the second request comprises a second specification of the geographically definable location in a second format specific to the second social media content provider, the second format being different than the first format;

obtaining, by the computer, at least the first social media content item relevant to the geographically definable location based on the first request, and the first content contextual information that describes the context in which the first social media content item was created; and obtaining, by the computer, at least a second social media content item relevant to the geographically definable location based on the second request, and second content contextual information that describes a context in which the second social media content item was created.

15. The method of claim 14, wherein determining a match between at least some of the reality contextual information and the content contextual information comprises:

determining, by the computer, that there exists a first match between at least some of the reality contextual information and the first content contextual information, wherein the first match indicates a match between the context of the physical space and the context in which the first social media content item was created; and determining, by the computer, that there exists a second match between at least some of the reality contextual information and the second content contextual information, wherein the second match indicates a match between the context of the physical space and the context in which the second social media content item was created.

16. The method of claim 15, the method further comprising:

causing, by the computer, a second graphical representation of the second social media content item to be included in the augmented space responsive to a determination that there exists the second match between at least some of the reality contextual information and the second content contextual information.

17. The method of claim 12, wherein the one or more sensor measurements relate to an altitude of the first device that includes the one or more sensors, the method further comprising:

determining, by the computer, that the social media content was created at an altitude that is the same as the altitude of the first device.

18. The method of claim 12, wherein the one or more sensor measurements relate to an ambient condition of the first device that includes the one or more sensors, the method further comprising:

determining, by the computer, that the social media content was created at an ambient condition that is the same as the ambient condition of the first device.

19. The method of claim 12, wherein the one or more sensor measurements relate to an altitude of the first device that includes the one or more sensors and an ambient condition related to the device, the method further comprising:

determining, by the computer, that the social media content was created at an altitude that is the same as the altitude of the first device; and determining, by the computer, that the social media content was created at an ambient condition that is the same as the ambient condition of the first device.

20. The method of claim 11, wherein identifying the geographically definable location associated with the physical space comprises:

recognizing, by the computer, an object from the image of the physical space; and associating, by the computer, the recognized object with a recognized location, wherein the geographically definable location is determined based on the recognized object.

* * * * *